United States Patent
Annangi et al.

(10) Patent No.: US 12,249,119 B2
(45) Date of Patent: Mar. 11, 2025

(54) DOMAIN ADAPTATION USING PSEUDO-LABELLING AND MODEL CERTAINTY QUANTIFICATION FOR VIDEO DATA

(71) Applicant: GE Precision Healthcare LLC, Wauwatosa, WI (US)

(72) Inventors: Pavan Annangi, Bangalore (IN); Deepa Anand, Bangalore (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 312 days.

(21) Appl. No.: 17/654,019

(22) Filed: Mar. 8, 2022

(65) Prior Publication Data

US 2022/0301287 A1    Sep. 22, 2022

(30) Foreign Application Priority Data

Mar. 23, 2021  (IN) .............................. 202141012577

(51) Int. Cl.
*G06T 7/00*      (2017.01)
*G06V 10/764*    (2022.01)
*G06V 10/774*    (2022.01)

(52) U.S. Cl.
CPC .......... *G06V 10/764* (2022.01); *G06T 7/0012* (2013.01); *G06V 10/774* (2022.01);
(Continued)

(58) Field of Classification Search
CPC ...... G06V 10/774; G06V 10/764; G06T 7/00; G06T 7/0012; G06T 2207/20081; G06T 2207/20048
See application file for complete search history.

(56) References Cited

PUBLICATIONS

Sun, B. et al. | "Deep CORAL: Correlation Alignment for Deep Domain Adaptation." arXiv:1607.01719v1 [cs.CV] Jul. 6, 2016, 7 pages.

(Continued)

*Primary Examiner* — Tuan H Nguyen
(74) *Attorney, Agent, or Firm* — Amin, Turocy & Watson, LLP

(57) ABSTRACT

Systems and method for domain adaptation using pseudo-labelling and model certainty quantification for video data are provided. The method includes obtaining a source data and a target data each comprising a plurality of frames for processing by a machine learning module. The method comprises testing the target data to identify if a minimum number of frames exhibit a frame confidence score based on the source data and identifying salient region within the target data and measuring a degree of spatial consistency of the salient region over time. The method comprises identifying class specific attention region within the target data and measuring a confidence score of class specific attention region within the target data and carrying out pseudo-labeling of the target data based on the source data and calculating a certainty metrics value based on the frame confidence score, the degree of spatial consistency of the salient region over time, the confidence score of class specific attention region within the frames of the target data and confidence score of the pseudo-labeling on the target data. The machine learning module is retrained till the certainty metrics value reaches peak and further retraining the machine learning module does not increase the certainty metrics value.

20 Claims, 6 Drawing Sheets

(52) U.S. Cl.
CPC .............. *G06T 2207/20048* (2013.01); *G06T 2207/20081* (2013.01)

(56) References Cited

PUBLICATIONS

Yan, H. et al. | "Mind the Class Weight Bias: Weighted Maximum Mean Discrepancy for Unsupervised Domain Adaptation." arXiv:1705.00609v1 [cs.CV] May 1, 2017, 10 pages.

Lee, D.-H. | "Pseudo-Label : The Simple and Ecient Semi-Supervised Learning Method for Deep Neural Networks". ICML 2013 Workshop : Challenges in Representation Learning (WREPL), Atlanta, Georgia, USA, 2013, 6 pages.

DOMAIN ADAPTATION USING PSEUDO-LABELLING AND MODEL CERTAINTY QUANTIFICATION FOR VIDEO DATA

CROSS-REFERENCE TO RELATED APPLICATIONS

This application claims priority to India Provisional Application No. 202141012577, filed Mar. 22, 2021, entitled DOMAIN ADAPTATION USING PSEUDO-LABELLING AND MODEL CERTAINTY QUANTIFICATION FOR VIDEO DATA". The entirety of the aforementioned application is hereby incorporated herein by reference.

TECHNICAL FIELD

This application relates to domain adaptation of machine learning (ML) models, and more particularly to domain adaptation using pseudo-labelling and model certainty quantification for video data.

BACKGROUND

Deep learning is a class of machine learning techniques employing representation learning methods that allows a machine to be given raw data and determine the representations needed for data classification. Deep learning ascertains structure in data sets using backpropagation algorithms. Deep learning machines may utilize a variety of multilayer architectures and algorithms. While machine learning, for example, involves an identification of features to be used in training the network, deep learning may process raw data to identify features of interest without the external identification. The raw data may be an image data or a video data obtained using medical imaging techniques like ultrasound, X-ray, computed tomography (CT), and magnetic resonance imaging (MRI).

Deep learning in a neural network environment includes numerous interconnected nodes referred to as neurons. Input neurons, activated from an outside source, activate other neurons based on connections to these other neurons which are governed by the machine operating conditions. A neural network behaves in a certain manner based on its own sequences. Learning refines the machine output, and the connections between neurons in the network such that the neural network behaves in a desired manner.

Deep learning that utilizes a convolutional neural network segments data using convolutional filters to locate and identify learned, observable features in the data. Each filter or layer of the convolution neural network (CNN) architecture transforms the input data to increase the selectivity and invariance of the data. This abstraction of the data allows the machine to focus on the features in the data that the machine attempts to classify and ignore irrelevant background information.

Deep learning operates on the understanding that many datasets include high level features and low-level features. At high level, while examining an image, for example includes, rather than looking for an object, it is more efficient to look for edges which form motifs which form parts, which form the object being sought. These hierarchies of features may be found in many different forms of data such as video data, image data, speech and text, etc.

Learned observable features include objects and quantifiable regularities learned by the machine during supervised learning. A machine provided with a large set of well classified data is better equipped to distinguish and extract the features in successful classification of new data than the traditional algorithms that are not continuously trained to classify the data.

A deep learning machine that utilizes transfer learning may properly connect data features to certain classifications affirmed by a human expert. Conversely, the same machine may, when informed of an incorrect classification by a human expert, update the system for classification. Settings and/or other configuration information, for example, may be guided by learned use of settings and/or other configuration information, and, as a system is used more (e.g., repeatedly and/or by multiple users), a number of variations and/or other possibilities for settings and/or other configuration information may be reduced for a given situation.

An example deep learning neural network may be trained on a set of expert classified data, for example. This set of data builds the neural network and is the stage of supervised learning. During the stage of supervised learning, the neural network may be tested whether the desired behavior has been achieved.

Once a desired neural network behavior has been achieved (e.g., a machine has been trained to operate according to a specified threshold, etc.), the machine may be deployed for use (e.g., testing the machine with "real" data, etc.). During operation, neural network classifications may be confirmed or denied (e.g., by an expert user, expert system, reference database, etc.) to continue improving neural network behavior.

Deep learning machines may provide computer aided detection support to improve their image analysis with respect to image quality and classification, for example. However, issues faced by deep learning machines when applied to the medical field often lead to numerous false classifications. For example, deep learning machines need to overcome small training datasets and repetitive adjustments.

Deep learning (DL) models are used in medical image processing and analysis tasks like organ segmentation, anomaly detection, image reconstruction, and so on. Most often these models are trained on specific type of source domain images (non-contrast or contrast, specific field-of-view (FOV), dosage, demography, etc.). It is desirable to re-use/re-purpose these models for a different but similar target domain. However, it is difficult to adapt these models to accurately perform on another domain for which little or no ground truth training data is available. Therefore, it is desirable to provide for adapting deep learning models for images across different domains in the absence of annotated data for target domain.

Pseudo-labelling approach in deep learning involves using a deep learning model trained on a source data and generating pseudo-labels for target data which may be further used in training the deep learning model. For a pseudo-labelling model to succeed, label certainty estimation is crucial. Mis-labeling of images from target domain may occur due to various reasons including domain shift that would bring down the performance of the deep learning model. Labels may be filtered to identify mis-labeling and correct the same. Further, the problem of over-confidence of the deep learning modules adds to the problem of mis-labeling when the input data for analysis differs in distribution. Accordingly, confidence scores of the deep learning modules may not be sufficient to filter the pseudo-labels. Further, when the data to be analysed and labelled is a video data, generating video labels on the data and estimating the confidence score of the deep learning module becomes even more challenging. Accordingly, there is a need for providing supplementary techniques for deep learning model confidence estimation for video data. If the confidence score of the deep learning module is found to be above the predetermined score, the deep learning module and the labelling of the video may be accepted. If the confidence score of the deep learning module is found to be below the predetermined score, the deep learning module may be retrained till the module achieves the predetermined confidence score that indicates improvement in the labelling quality. However, the existing labelling methods need improvement in quality of labelling, confidence scores of the labelling models and retraining for continuously increasing the accuracy of the machine learning modules.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that facilitate domain adaptation of image processing models.

According to an aspect of the disclosure, a method for domain adaptation using pseudo-labelling and model certainty quantification for a video data is provided. The method comprises obtaining using a same or different medical imaging devices a source data and a target data wherein the source data and the target data comprises a plurality of frames for training a machine learning module. The method further comprises testing the target data to identify if a minimum number of frames from the target data exhibit a frame confidence score based on the source data. The method further comprises identifying at least one salient region within the target data and measuring a degree of spatial consistency of the at least one salient region over time. The method further comprises identifying at least one class specific attention region within the frames of the target data and measuring a similarity score of at least one class specific attention region within the frames of the target data as compared to a plurality of class-specific templates. The method further comprises carrying out pseudo-labeling of the target data based on the source data and calculating a certainty metric value indicative of the accuracy of the pseudo-labeling on the target data. Calculating the certainty metrics value comprises calculating using the frame confidence score, the degree of spatial consistency of the at least one salient region over time, the similarity score of at least one class specific attention region within the frames of the target data. The method further comprises retraining the machine learning module till the certainty metrics value reaches peak and further retraining the machine learning module does not increase the certainty metrics value.

According to an aspect of the disclosure, a system is provided for domain adaptation using pseudo-labelling and model certainty quantification for a video data. The system comprises a memory that stores computer executable components, and a processor that executes the computer executable components stored in the memory. The computer executable components comprise a training component adapted to train a machine learning module and configured to receive a source data obtained using a same or different medical imaging devices and wherein the source data comprises a plurality of frames. The system further comprises an image processing component configured to receive a target data from the same or different medical imaging devices, test the target data to identify if a minimum number of frames from the target data exhibit a frame confidence score based on the source data, identify at least one salient region within the target data and measure a degree of spatial consistency of the at least one salient region over time and identify at least one class specific attention region within the target data and measure a similarity score of at least one class specific attention region within the frames of the target data as compared to a plurality of class-specific templates. The system further comprises a pseudo-labeling component configured to label the target images based on the source data and calculate a certainty metric value indicative of the accuracy of the pseudo-labeling on the target data. The system further comprises a model certainty quantification component configured to calculate a certainty metrics value based on the frame confidence score, the degree of spatial consistency of the at least one salient region over time, the similarity score of the at least one class specific attention region within the frames of the target data as compared to a plurality of class-specific templates. The system further comprises a retraining component configured to retrain the machine learning module till the certainty metrics value reaches peak and further retraining the machine learning module does not increase the certainty metrics value.

In some embodiments, elements described in the disclosed systems can be embodied in different forms such as a computer-implemented method, a computer program product, or another form.

DETAILED DESCRIPTION

Figure 1:
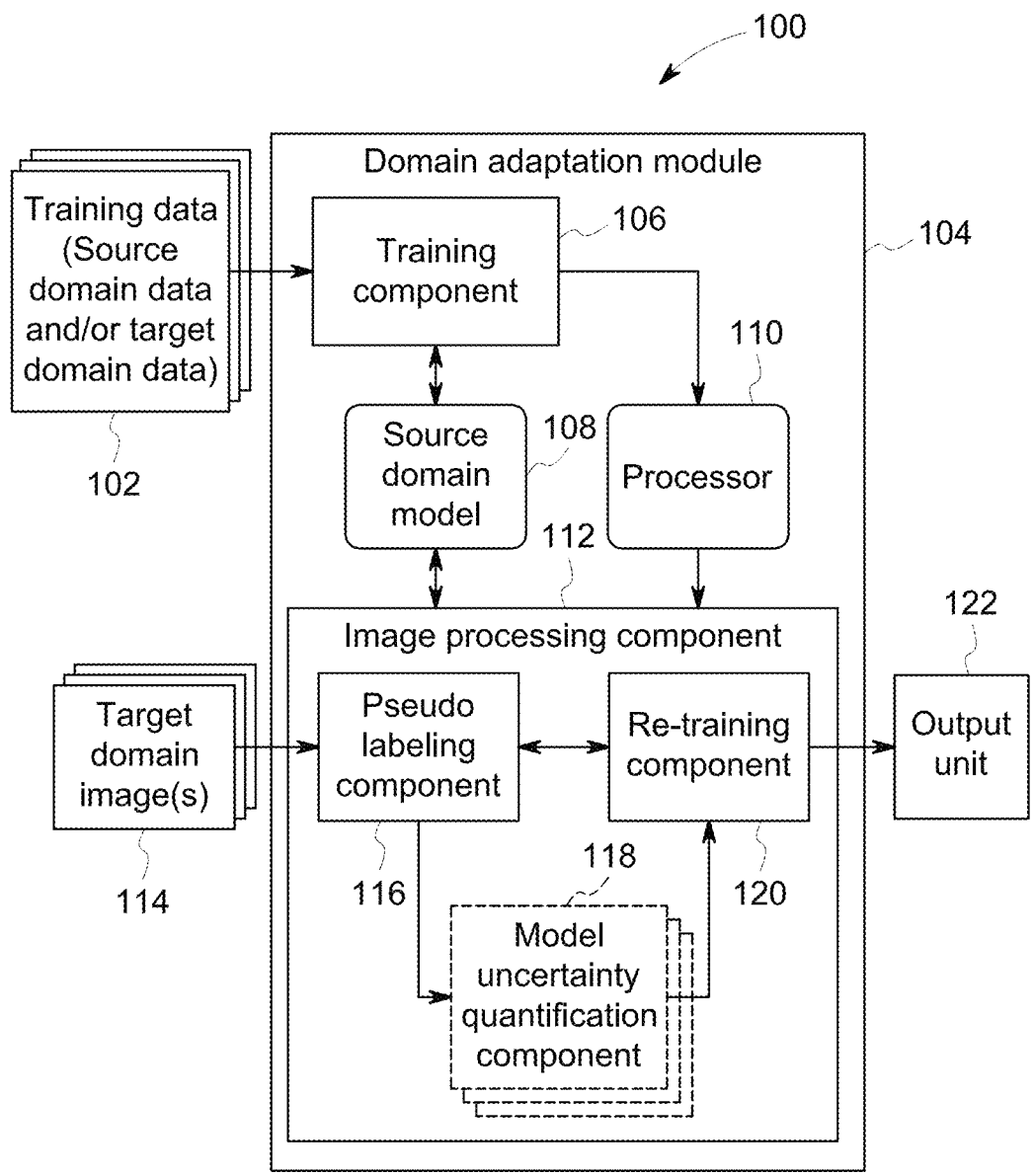
FIG. 1 illustrates a system for domain adaptation using pseudo labels in accordance with an aspect of the disclosure.

The following detailed description is merely illustrative and is not intended to limit embodiments and/or application or uses of embodiments. Furthermore, there is no intention to be bound by any expressed or implied information presented in the preceding Summary section or in the Detailed Description section.

In the following specification and the claims, reference will be made to a number of terms, which shall be defined to have the following meanings.

The singular forms "a", "an", and "the" include plural references unless the context clearly dictates otherwise.

As used herein, the terms "software" and "firmware" are interchangeable and include any computer program stored in memory for execution by devices that include, without limitation, mobile devices, clusters, personal computers, workstations, clients, and servers.

As used herein, the term "computer" and related terms, e.g., "computing device", "computer system" "processor", "controller" are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "systems", "devices" and "apparatuses are interchangeable and include components, sub-components, sub-systems that include without limitation the medical imaging devices.

A deep learning model trained on a specific source domain is expected to work on images from other cohorts and similar domains as well. However, these models, when tested on images from a different but similar target domain perform at a much lower accuracy than expected owing to changes in the imaging machines used to capture the images, image capture protocol, demography or other variations between the source domain images and the target domain images. An example of this includes a deep learning model trained using the ultrasound images or video data which when used for inferencing on contrast enhanced diagnostic images, shows low accuracy and incorrect organ segmentation or identification. Further, when the target data is a video data with high degree of domain shift, labeling of the contents within the video data may suffer from high degree of inaccuracy and results obtained from such exercise are uncertain. Thus, there is a need to quantify and predict the amount of certainty and improve the accuracy of the predictions from these models when applied to new domains.

Domain adaptation is an active area of research where various methods have been used to effectively adapt models trained for an original application for new target applications. The ideal approach towards domain adaptation is that while training of the model itself the data used should be an unbiased representation of source and target domains. However, this is not always feasible as the data distributions between the source domain data on which the network is trained and the target domain data is shifted. This leads to low network performance on the target domain data.

The disclosed subject matter is directed to systems, computer-implemented methods, apparatus and/or computer program products that facilitate domain adaptation using pseudo labelling and model certainty quantification for video data processing models with no or very little labelled data/ground truth for the target domain. In various embodiments, the image processing models can include artificial intelligence/machine learning medical image processing models. The disclosed domain adaptation techniques can also be extended to AI/ML image analysis/processing models configured to perform similar inferencing tasks on non-medical domains. In one or more embodiments, the disclosed domain adaptation techniques are independent of the trained source domain model and correct the model prediction for an image from a target domain as a post-processing step. In this regard, the disclosed domain adaptation processes address some of the challenges of prior domain adaptation methods as they: (a) can use any pre-trained architecture and adapt it for a new domain; (b) maintain performance of the source domain undisturbed; and/or (c) provide a plug-and-play architecture where one target domain can be replaced easily by another without affecting the original pre-trained model.

In one or more embodiments, the disclosed domain adaptation method may involve using pseudo labels on the target video data to determine the class confidence level of the source domain model when applied to images of a different but similar domain, referred to herein as the target domain. In further non-limiting example, the method may involve classifying the video data into a number of frames and among these total number of frames a certain number of frames have to pass a minimum confidence score of being a view using the source model. In another non-limiting example, the source model will identify and highlight the salient regions in the target video data and calculate certainty matric based on the degree of spatial consistency over the time of the highlighted salient regions. In another non-limiting example, the view specific attention regions in a video data may be identified and the salient region extractor feature of the source model shall accurately identify the attention regions and identifying a wrong attention region within the video data by the source model is indicative of low certainty of the domain adaptation for the given source model. In another non-limiting example, the certainty value or certainty score for the domain adaptation for the given source model is calculated and the domain adaptation is considered successful only if the certainty score is above the minimum score predetermined for the model. In another non-limiting example, the method for domain adaptation may include using the source model on the unlabelled video data and generate a certainty metrics. When the certainty score is above the minimum predetermined score, the method includes further generating the pseudo labels on the video data and retrain the model to increase the certainty score and accuracy of the labelling. This method may be iteratively carried out till the certainty score of the model reaches a plateau and no further increase in certainty score is possible.

In one or more non-limiting examples, the disclosed domain adaptation approach may be applied for pseudo-labeling and model certainty quantification for the video data (target data) using a deep learning model which is trained on images from a source domain and used for labeling and prediction on a different target domain. For example, the source model can include a video data for a specific organ (e.g., the liver, the heart, the kidneys, etc.) trained on images of the organ captured using a first type of imaging modality (for example, ultrasound, computed tomography (CT), X-ray etc.), which when used for prediction on video data of the same organ captured using a second type of imaging modality, does not perform accurately. The first and second types of imaging modalities can vary so long as they produce similar images with some variances in appearance (e.g., color, saturation, contrast, hue, density, brightness, etc.), FOV, depth, dimensionality, dosage, demography, or the like. In some implementations, the source domain images can comprise video data from a medical imaging device of a first vendor and the target domain images can comprise a video data from a medical imaging device of a second vendor. In accordance with these embodiments, the video data from the target medical imaging device may be labelled using the source video imaging data and certainty metrics may be calculated. In case of low certainty score, the source domain may be re-tuned identify and label the attention regions within the target domain. The method may be generic enough to be extended and applied to other domain adaptation use cases.

The term "source model" or "a machine learning model" or a "machine learning module" is used herein to refer to an AI/ML model configured to perform an image processing or analysis task on images. The image processing or analysis task can vary. In various embodiments, the image processing or analysis task can include, (but is not limited to): a segmentation task, an image reconstruction task, an object recognition task, a motion detection task, a video tracking task, an optical flow task, an attention region identification task, an object labeling task and the like. The source model can employ various types of AI/ML algorithms, including (but not limited to): deep learning models, neural network models, deep neural network models (DNNs), convolutional neural network models (CNNs), and the like. The terms "source domain model", "source model" "source image processing model", "source domain image processing model" and the like are used herein interchangeably to refer to an imaging processing model trained on images from specific domain, referred to herein as the source domain. Images included in the source domain are referred to herein as "source domain images" or "source images." The terms "target domain model", "target model", "target image processing model", "target domain image processing model", and the like, are used herein interchangeably to refer to an imaging processing model configured to perform a same or similar image processing task as a corresponding source domain model, yet on images from a different but similar domain, referred to herein as the "target domain." Images included in the target domain are referred to herein as "target domain images" or "target images".

In this regard, source domain (SD) images and target domain (TD) images can include similar images that have some consistent variations. These consistent variations can be based on different capture modalities, acquisition protocols, demography, and other factors affecting image quality (IQ) or appearance. In some implementations, the SD image and the TD images comprise images captured of the same object that differ with respect to at least one visual appearance property. In other implementations, the SD image and the TD images comprise medical images of a same anatomical body part (e.g., a same organ), yet differ with respect to capture modality. For example, with respect to RT images (e.g., CT scans, MRI scans, etc.), the SD images and the TD images can vary with respect to having or not having contrast injection. The RT images can also vary with respect to different capture voltages. For example, the RT images are generally captured at varying kilovoltages for different applications, ranging from 70 kilovolts (kVs) to about 140 kVs, which can cause variances in the resulting image quality. In another example, the SD and TD images can include MRI images that vary with respect to sequence intensities.

As used herein, a "medical imaging or "image processing" refers to an image processing that is tailored to perform an image processing/analysis task on one or more medical images. For example, the medical image processing/analysis task can include (but is not limited to): organ segmentation, anomaly detection, anatomical feature characterization, medical image reconstruction, diagnosis, labeling, pseudo-labeling of the target images and the like. The types of medical images processed/analyzed by the medical image processing model can include images captured using various types of imaging modalities. For example, the medical images can include (but are not limited to): radiation therapy (RT) images, X-ray images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can include two-dimensional (2D) images as well as three-dimensional images (3D). Further, the images may be stand-alone images or video data comprising set of images and a source model trained using these images for analyzing the target video images.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an aspect of the disclosure, a method for domain adaptation using pseudo-labelling and model certainty quantification for a video data is provided. The method comprises obtaining using a same or different medical imaging devices a source data and a target data wherein the source data and the target data comprises a plurality of frames for training a machine learning module. The method further comprises testing the target data to identify if a minimum number of frames from the target data exhibit a frame confidence score based on the source data. The method further comprises identifying at least one salient region within the target data and measuring a degree of spatial consistency of the at least one salient region over time. The method further comprises identifying at least one class specific attention region within the frames of the target data and measuring a similarity score of at least one class specific attention region within the frames of the target data as compared to a plurality of class-specific templates. The method further comprises carrying out pseudo-labeling of the target data based on the source data and calculating a certainty metric value indicative of the accuracy of the pseudo-labeling on the target data. Calculating the certainty metrics value comprises calculating using the frame confidence score, the degree of spatial consistency of the at least one salient region over time, the similarity score of at least one class specific attention region within the frames of the target data as compared to a plurality of class-specific templates. The machine learning model is retrained till the certainty metrics value reaches peak and further retraining the machine learning module does not increase the certainty metrics value.

Embodiments of the present disclosure will now be described, by way of example, with reference to the figures, in which FIG. 1 illustrates a block diagram of an example, non-limiting system 100 for domain adaptation using pseudo labels in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. In one example, the system 100 includes a domain adaptation module 104 that may include various computer/machine executable components, including a training component 106, a source domain model 108, a processor 110, an image processing component 112, a pseudo labeling component 116, a model certainty quantification component 118 and a retraining component 120. These computer/machine executable components (and other described herein) can be stored in memory (not shown) associated with the one or more machines (not shown). The memory can further be operatively coupled to at least one processor 110, such that the components (e.g., the training component 106, the source domain model 108, the processor 110, the image processing component 112, the source domain model application component 116, retraining component 120, and other components described herein), may be executed by the at least one processor to perform the operations described.

The domain adaptation module 104 may facilitate domain adaptation of image processing models from a source domain to a target domain. In the embodiment shown, the source domain model 108 corresponds to the image processing model that is "adapted" from the source domain to the target domain. The source domain model 108 may include an image processing model trained to perform a specific image processing task on images or video data from a source domain. The image processing task and the source domain may vary. For example, the source domain model 108 may include AI/ML medical image processing model, such as a video labeling model, an organ segmentation model, an anomaly detection model, an image reconstruction models, and the like. The source domain model 108 may also include AI/ML image analysis/processing model configured to process the images in non-medical domains. However, it should be appreciated that the disclosed techniques are not limited to this example implementation.

In various embodiments, the domain adaptation module 104 may facilitate domain adaptation, that is re-purposing or re-using the source domain model 108 for a new target domain, using an image processing component 112. In particular, the domain adaptation module 104 may employ a domain adaptation architecture that preserves the integrity of the source domain model 108, leaving the source domain model unaffected by the target data, however, the source domain model 108 may be re-tuned to more correctly apply it to the target domain. The domain adaptation module 104 may train an image processing module 112 to adapt or correct the output of the source domain model 108 to account for variations between the source domain input and the target domain input. In this regard, the domain adaptation module 104 provides domain adaptation techniques that are independent of the trained source domain model 108 and corrects the source domain model prediction for an image from a target domain.

To facilitate this end, the domain adaptation module 104 may comprise a training component 106 that trains the source domain model 108 to identify and label the region of attention in the source video data. Typically, the video image data may consist of several individual frames that together constitute a video image data. In each video image frame, the region of attention within the frame may be defined by the location of the object of interest within the frame. The source domain model 108 may be trained using the known training techniques used in the field of machine learning. The target domain images 114 may be captured for the same object that differs with respect to at least one visual appearance property from the source image data. In other implementations, the source domain images and the target domain images comprise medical images or video data of a same anatomical body part (e.g., a same organ), yet differ with respect to capture modality, or the images may vary with respect to having or not having contrast injection, or different capture voltages for CT scan images or the MRI images that vary with respect to sequence intensities.

The target domain images 114 may be unlabeled or partly labeled images. These unlabeled or partly labeled images may be presented to a pseudo-labeling component 116 to generate pseudo labels on the target domain data 114. The target domain data 114 in one example may be a video data comprising several individual video frames. In one aspect, consistency in the individual frames of the target data may be used as an indicating parameter for predicting the certainty in the domain adaptation. For the pseudo-labeling model 116 to correctly identify and label the elements within the target data 114, it is necessary to confirm the consistency of the frames of the target video data 114 and generate a confidence score indicative of the quality of the target video data 114. When the consistency of the frames of the target video data 114 is above the minimum confidence score, the target video data 114 meets the minimum labeling criteria for successfully labeling the target video data 114. The source model 108 may be used to decide the confidence score of the target video data 114 by evaluating if the certain minimum number of individual frames of the video data 114 pass the confidence score. When the certain minimum number of individual frames of the video data 114 pass the confidence score, the target video data 114 may be considered uniform for pseudo-labeling. However, if the confidence score of the target video data 114 is lesser than the minimum target score, it becomes necessary to quantify the uncertainty presented by the target video data 114.

Once the confidence score of the target video data 114 is determined based on the certain minimum number of individual frames passing the confidence score, pseudo-labelling component 116 for domain adaptation for video data 114 may be implemented. The pseudo-labeling component 116 may have access to the source annotated data ($S_L$) and the target labelled data ($T_L$), target unlabelled data ($T_{UL}$), if available. The pseudo-labelling component 116 may generate annotations for the target unlabelled data ($T_L$), along with the certainty metric value. This process may be repeated until the model achieves its peak performance in labelling the target data 114. The target data 116 along with the annotations is filtered for use in the next iterations if the agreement in prediction across different frames is above threshold, average confidence score of the data belonging the majority class is above threshold, consistency in identifying the salient features in the frame of the video data 114 and degree of presence of class-specific landmarks across frames in the loop. In one example, the target data 114 along with the pseudo labels or annotations is filtered for use in the next iterations. The source annotations and target filtered pseudo-annotations are used for retraining the machine learning model.

In one example, some of the available methods for domain adaptation include discrepancy-based methods of domain adaptation. The method includes training using a source data a machine learning module that may accurately identify certain objects and store the results for target data identification. Another machine learning module may be trained using an unlabeled target data and stored for future reference. The ability of the machine learning module to correctly identify and label the target data based on the source data may be improved using the discrepancy loss function that indicates the difference in features distribution in transformed space between source data and the target data. The first order discrepancy loss function may be defined as:

$$D_{ts}^{(m)}(\chi_t, \chi_s) = \left\| \frac{1}{N_t} \sum_{i=1}^{N_t} f^{(m)}(x_{ti}) - \frac{1}{N_s} \sum_{i=1}^{N_s} f^{(m)}(x_{si}) \right\|_2^2.$$

Further, the CORAL second order discrepancy loss function may be used and defined as:

$$\ell_{CORAL} = \frac{1}{4d^2} \|C_S - C_T\|_F^2$$

The discrepancy-based methods of domain adaptation use multiple loss functions including the classification loss or discrepancy loss to update the network parameters and process the target data iteratively to improve the accuracy of the domain adaptation.

Another known technique known in the field of domain adaptation includes using the pseudo labeling approach to label the objects and salient features of the object using the labeled data. Pseudo labeling may train the network with a set of labeled data and unlabeled data simultaneously. For each of the labeled and unlabeled data the training loop may include one forward pass on the labeled data to calculate the loss (labeled loss) and one forward pass on the unlabeled data to predict the "pseudo labels" for the unlabeled data. These pseudo labels may be used to calculate the unlabeled loss by assigning the weights to the loss calculation functions. The overall loss function may be:

$$L = \frac{1}{n} \sum_{m=1}^{n} \sum_{i=1}^{C} L(y_i^m, f_i^m) + \alpha(t) \frac{1}{n'} \sum_{m=1}^{n'} \sum_{i=1}^{C} L(y_i'^m, f_i'^m),$$

Further, an important aspect that affects the accurate domain labeling is domain shift within the target domain. For example, it may be easier to identify, match and label the stationary objects within the target domain with no domain shift, however, if the objects within the target domain are moving or the individual features within the object are not stationary, the pseudo labels applied to such moving objects may not be accurate. This inaccuracy due to the domain shift may potentially generate significantly inaccurate labelling. Correcting such errors may require iteratively processing the target domain data till sufficient labeling accuracy is achieved and the process becomes time consuming.

It is also important to identify the domain shift associated with the target domain, consistency of the location of the features across the frames and class specific landmarks to determine the overall certainty in the target domain. Higher uncertainty indicative of the target domain shift will increase the inaccuracy in labeling the target domain. Therefore, estimation of the certainty in the target domain is critical to the success of the pseudo-labeling model.

Figure 2A:
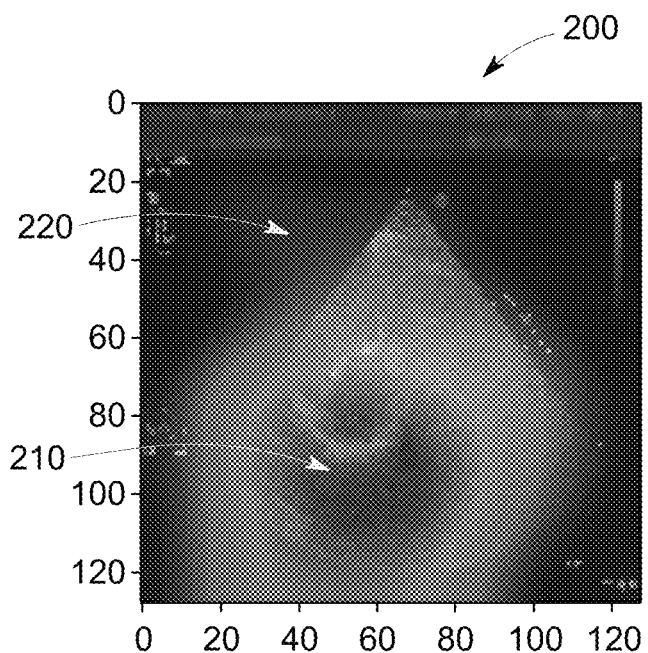
FIG. 2a illustrates spatially consistent activation maps in a frame of a video data in accordance with an aspect of the disclosure.
Figure 2B:
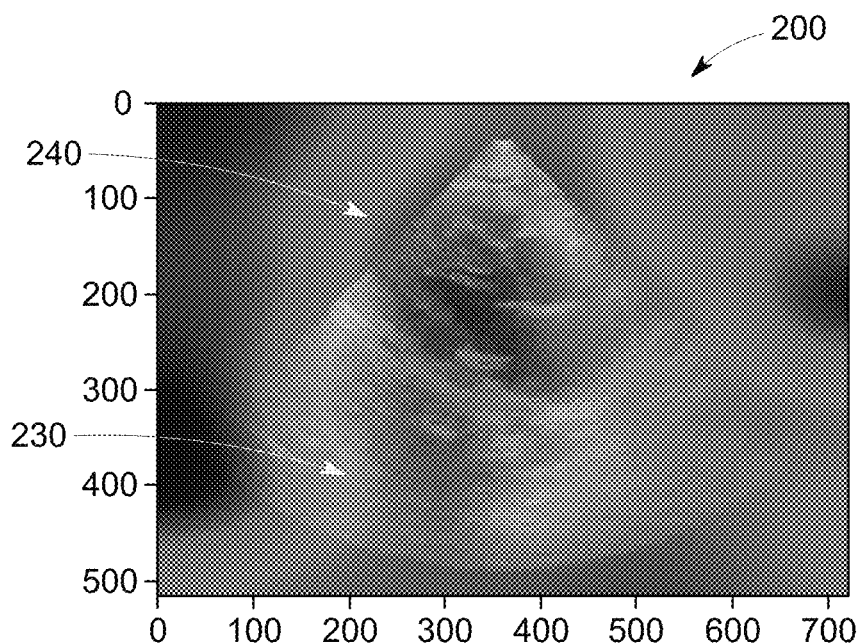
FIG. 2b illustrates spatially inconsistent activation maps in a frame of a video data in accordance with an aspect of the disclosure.

According to an aspect of the disclosure, FIG. 2a shows spatially consistent activation maps in a frame of a video data in accordance with an aspect of the disclosure. As shown in FIG. 2a, an image (200) in which the object of interest or the attention region (210) is located on lower left side of the image (200). In another aspect, consistency of location of the attention region (210) over several frames in a video data may be used as an indicating parameter for predicting the certainty in the domain adaptation. In a video data, if the position of the attention region (210) remains consistent across several frames at the dark portion 210 shown in FIG. 2a, the image frame may be considered to have spatially consistent activation maps. The attention region (210) remains constant and does not move to region (220). When the spatial consistency is high, the pseudo-labeling module will be able to identify the attention region (210) more accurately and label it. The attention region (210) is consistent and has not spread to region (220). According to an aspect of the disclosure, FIG. 2b shows a spatially inconsistent activation maps in a frame of a video data in accordance with an aspect of the disclosure. As shown in FIG. 2b, in a video data, if the location of the attention region (230) is not consistent or if the boundary of the attention region (230) is not clear, the object may appear without sharp edges or the object may be considered having spatially in-consistent activation maps. In this case, the attention region (230) has spread to region (240) indicating higher inconsistency in activation maps.

Figure 3:
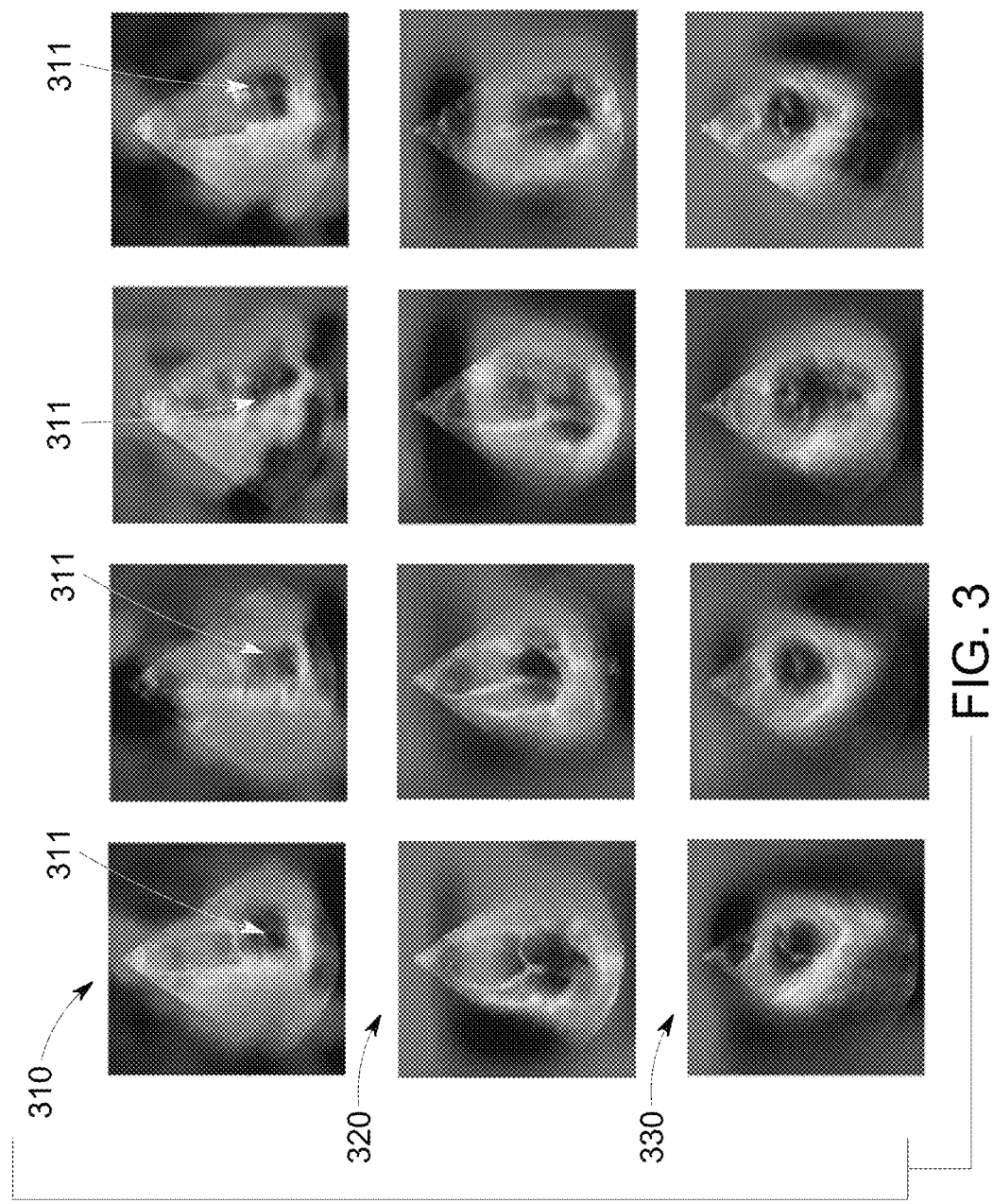
FIG. 3 illustrates identifying class specific attention regions in a frame of a video data in accordance with an aspect of the disclosure.

According to an aspect of the disclosure, FIG. 3 shows identifying class specific attention regions in a frame of a video data in accordance with an aspect of the disclosure. In one example, the class specific attention region (311) may include a portion of the heart, for example, heart chamber (311). The method may include correctly identifying the class specific attention regions (311) across various images (310) and accurately labeling the attention regions (311). The method may further include generating a class specific machine learning model configured to identify the attention regions (311) for each image (310, 320, 330). In one example, the images of the heart chamber junction, aortic valve, blood vessels may be considered as separate attention regions (311) and an individual machine learning models may be generated for identifying the consistency of the attention regions (311) across various images.

Figure 4:
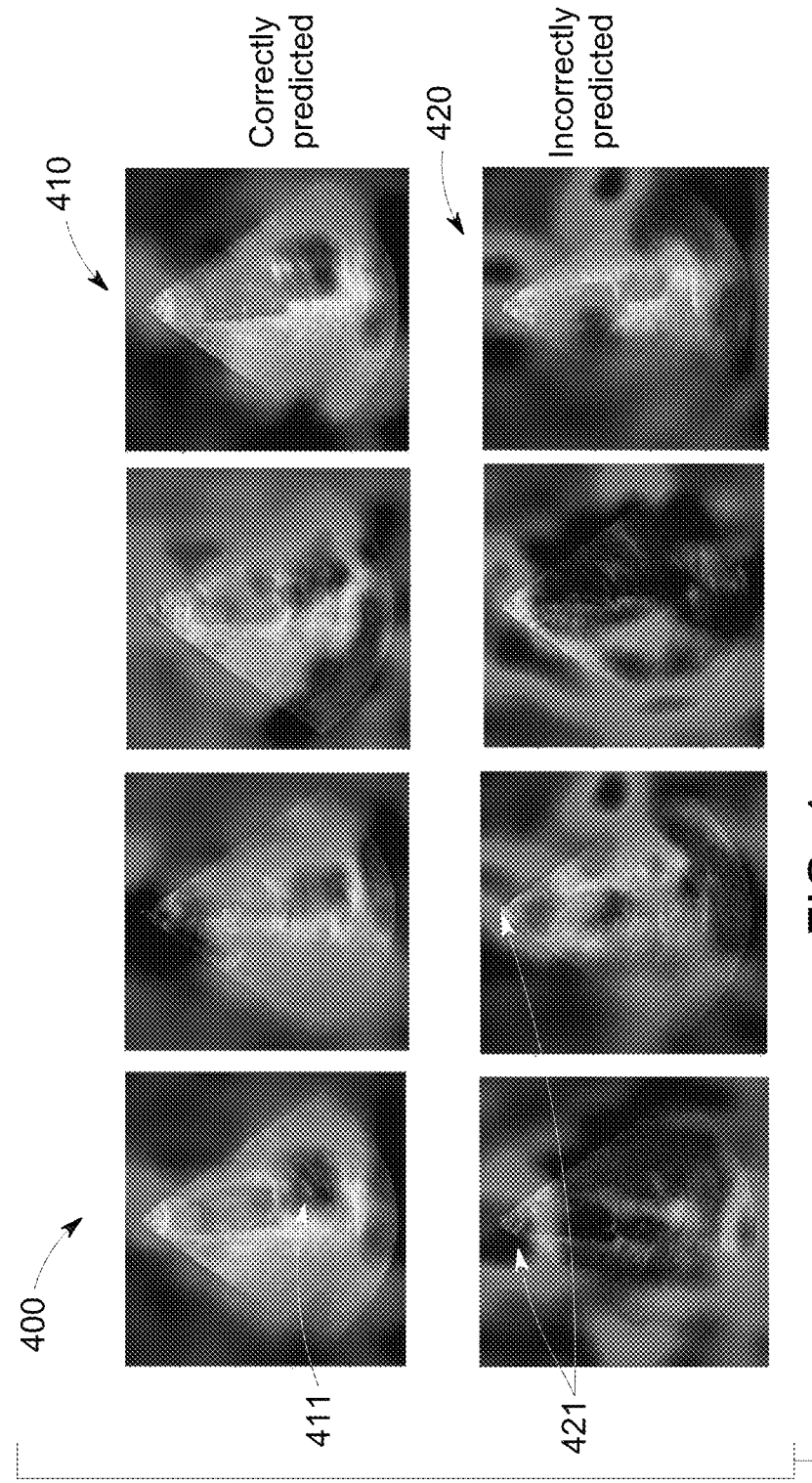
FIG. 4 illustrates an example two-chamber view (2CH) of a human heart representing the consistent and inconsistent activation maps across the images in accordance with an aspect of the disclosure.

In ultrasound imaging, two chamber view (2CH), four chamber view (4CH) and parasternal long-axis view (PLAX view) are most widely used imaging techniques for imaging the heart of a subject. In accordance with an aspect of the disclosure, FIG. 4 shows an example two-chamber view (2CH)(400) of a human heart (target data) where the images (410) represent the consistent attention regions (411) across the images (410). In one aspect of the disclosure, the method comprises measuring a similarity score of the of the class specific attention regions as compared to a plurality of class-specific templates. Decision on images belonging to different classes might require focus on certain class-specific landmarks. In one example, a classifier processing a four-channel (4CH) view of a cardiac ultrasound image may focus on the cross-section of the four chambers of the heart and such landmarks may be identified manually using domain expertise. A class specific template may be used to exemplify the landmarks (for example the cross section of the four chambers of the heart). By using the class-specific templates according to an aspect of the disclosure the model activation region for an image may contain the class specific landmarks. The absence of the landmarks in the target data may imply that a wrong attention region was picked up and may be considered an indicator of uncertainty. Given a sequence of frames and their activation region, a similarity score of the activation regions within the image with the class specific exemplars identified earlier might give an indication of the presence of required landmarks and act as a direct quantification of the certainty of the classifier on the set of frames.

When the attention regions (411) are consistent, the machine learning module will more accurately identify and label the images from the target domain. However, the images (420) have inconsistent attention regions (421), the machine learning module may not be able to accurately label the target domain images. Consistency of the class-based attention regions (411) within the images (410) improves the accuracy of the machine learning module in labeling the attention regions (411).

Figure 5:
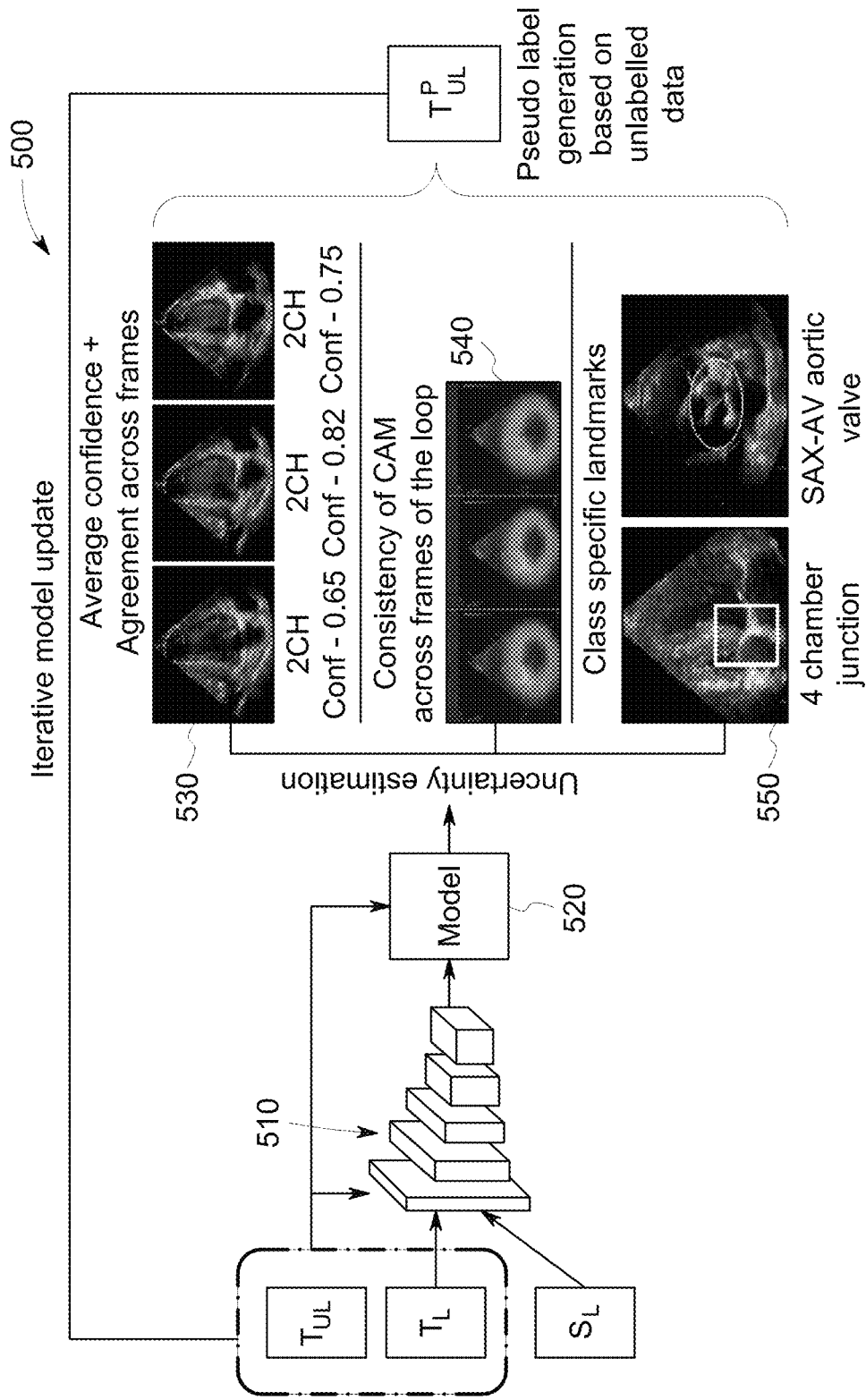
FIG. 5 illustrates a method of Domain Adaptation using Pseudo-labelling and Model certainty Quantification for Video Data in accordance with an aspect of the disclosure.

According an aspect of the disclosure, FIG. 5 shows a method for domain adaptation using pseudo-labelling and model certainty quantification for video data. The method may include providing a machine learning module (510) trained using the source labelled data ($S_L$) and providing a target data that may include a portion of target labelled data ($T_L$), target unlabeled data ($T_{UL}$) and unlabeled data from target $T_{UL}^P$ for which pseudo labels need to be generated. To generate an iterative model (520) for certainty estimation and quantification, the source labeled data ($S_L$) and the labelled target data ($T_L$), target unlabeled data ($T_{UL}$) and unlabeled data from target $T_{UL}^P$ may be processed by the machine learning module (510) based on the certain minimum number of frames (530) passing the confidence score, degree of spatial consistency of least one salient region over time (540) and consistency of class specific attention regions (550) or landmarks across the frames. When the confidence score of frames (530), degree of spatial consistency (540) and class specific attention regions (550) is above the minimum threshold, the target domain labeling may be considered accurate. The pseudo-labeled data $T_{UL}^P$ may be obtained using the labelling technique. The source annotations and target filtered pseudo-annotations may be used for training the machine learning model (510) and the process is iteratively repeated to increase the performance of the machine learning model (510). Training of the model (510) is repeated till the peak performance of the machine learning model (510) is achieved. However, when the confidence score of the frames (530), or the attention regions (540) or the class specific attention regions (550) is lower than the predetermined value, the pseudo-labeling of the target domain may not be accurate. Quantification of the consistency of frames (530), degree of spatial consistency of the at least one salient region (540) and class specific attention regions (550) may generate the certainty metric value indicative of the acceptability of the target domain for pseudo-labeling. When the certainty metric value of the target domain is above the minimum predetermined threshold, the pseudo label generation on the target domain may be considered accurate. Further, the process is repeated iteratively by feeding the filtered pseudo-labeled data to the machine learning model (510) to improve the labeling accuracy and efficiency. Iterative pseudo labeling is carried out till the peak performance of the machine learning model (510) is achieved.

Figure 6:
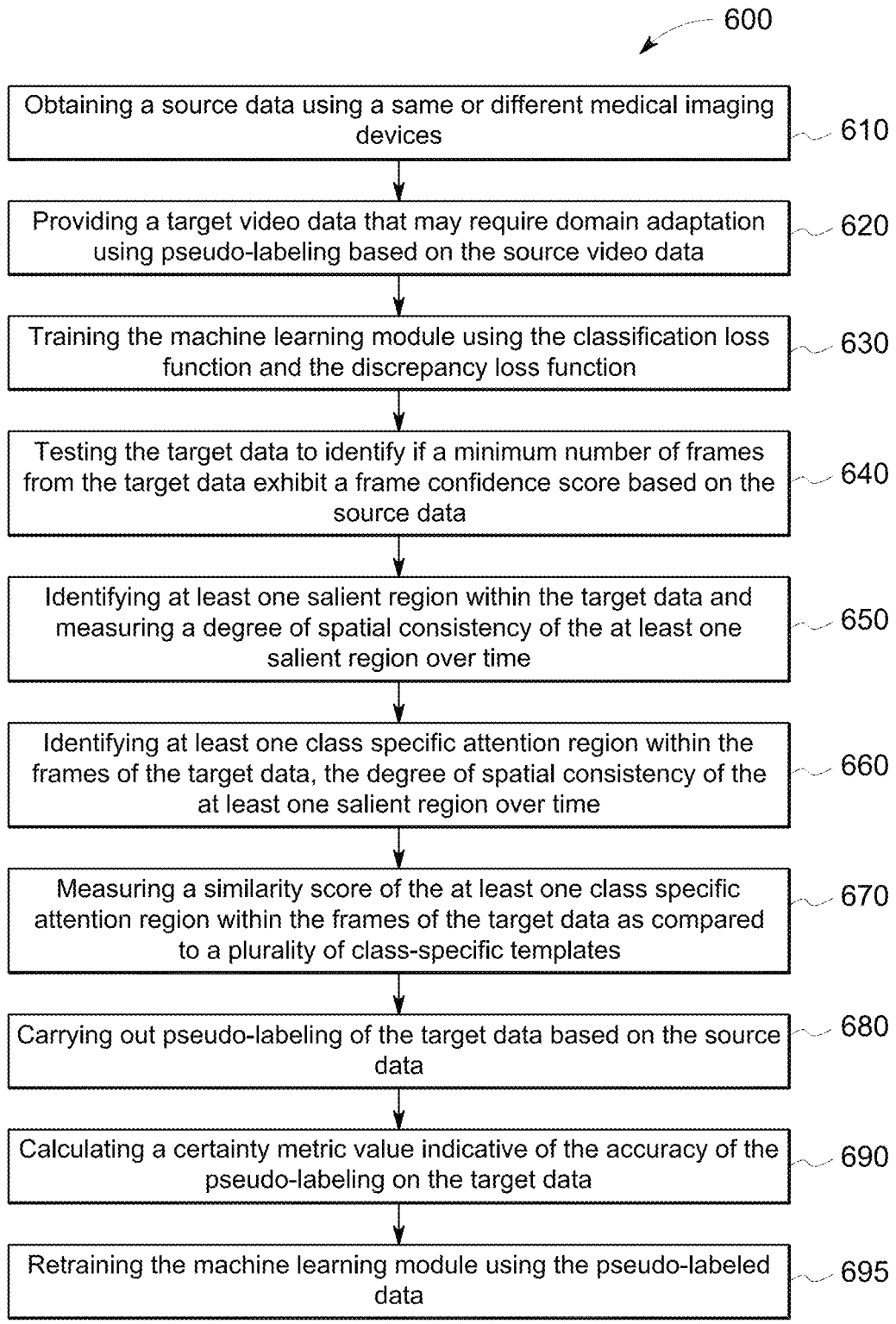
FIG. 6 illustrates a method of domain adaptation using pseudo labeling in accordance with an aspect of the disclosure.

In accordance with an aspect of the disclosure, FIG. 6 shows a method (600) for domain adaptation using pseudo labeling. The method (600) may include obtaining (610) a source data using a same or different medical imaging devices. The source data may be used for training the machine learning module. In one example, the source training video data may be a labeled data that contains correctly identified and labeled regions within the subject body including but not limited to abdominal region, cardiac region, lungs, head, lower abdomen that include different organs, organ tissues, salient features within the organs, bones, joints and portions of the body imaged by the medical imaging devices like ultrasound. The method further comprises providing (620) a target video data that may require domain adaptation using pseudo-labeling based on the source video data. The target data may be unlabeled video data or partially labeled video data and requires domain adaptation. The method (600) further comprises training (630) the machine learning module using the classification loss function and the discrepancy loss function. However, the discrepancy loss and classification loss functions may not increase the accuracy of labeling when the total loss calculation is based on the discrepancy loss and the classification loss alone, and it may not increase the accuracy of labeling on target domain once the certainty metric value peaks out. The training (630) of the machine learning module may be based on the weighted classification and discrepancy loss functions. In one conventional method, the weights assigned to classification loss and the discrepancy loss may be equal or the weight of the discrepancy loss function was increased when higher discrepancy in the target labeled data was observed.

The method (600) further comprises testing (640) the target data to identify if a minimum number of frames from the target data exhibit a frame confidence score based on the source data and identifying (650) at least one salient region within the target data and measuring a degree of spatial consistency of the at least one salient region over time. The method further comprises identifying (660) at least one class specific attention region within the frames of the target data, the degree of spatial consistency of the at least one salient region over time, and measuring a similarity score (670) of the at least one class specific attention region within the frames of the target data as compared to a plurality of class-specific templates. The method further comprises carrying out (680) pseudo-labeling of the target data based on the source data and calculating (690) a certainty metric value indicative of the accuracy of the pseudo-labeling on the target data. Accuracy of the domain adaptation is a function of how accurately the pseudo-labels have been applied to the target data. The method (600) for calculating (690) the certainty metrics value comprises calculating a certainty metrics value based on the frame confidence score, the degree of spatial consistency of the at least one salient region over time, the similarity score of the at least one class specific attention region within the frames of the target data as compared to a plurality of class-specific templates.

According to an aspect of the disclosure calculating (690) the certainty metrics value includes using a weighted pseudo-label classification loss function ($\alpha$) that is indicative of the confidence score, consistency in the target frames and attention regions. When the certainty metric value of the pseudo-labels reaches peak and stops improving, weight of the discrepancy loss function may be reduced and weight of the pseudo-label classification loss function (α) may be increased to improve the certainty metrics value. In generating the certainty metrics value, only the classification loss and pseudo-label classification loss may be assigned weights and weight of the discrepancy loss may be reduced. The net loss calculation may be defined as follows:

Loss=Classification loss+(1−α)(Discrepancy loss)+ (α)(Pseudo-label loss)

Wherein, α=fn (confidence, consistency, attention region), and wherein the value of α: 0<α<1.

In further aspect, the method (600) includes retraining (695) the machine learning module using the pseudo-labeled data. Retraining (695) may include using the source training data along with the pseudo-labeled data to increase the accuracy of training the machine learning module to identify the features more accurately within the target video image data. Retraining (695) may be carried out until the certainty metric value of the pseudo-labeled target domain goes above the predetermined certainty metric value and the target domain is labeled with increased accuracy than the traditional labeling methods. Even when the domain shift in the target domain is high, the retraining (695) of the machine learning module increases the certainty metric value of the machine learning model.

In one example, where the task is to classify the target cardiac ultrasound images into different views namely two chamber (2CH), four chamber (4CH), parasternal long-axis view (PLAX and APLAX), five chamber (5CH), subcostal view; the source data may be obtained using the ultrasound device from a first supplier of the medical devices. The source data may have certain number of loops and may be labelled using the known labelling techniques. The target data may be a video data obtained using an ultrasound device from a different supplier of the medical devices and needs to be labelled to understand and determine the medical condition of the subject. The target data may be unlabelled or partially labelled and processed according to the method (600) of the present disclosure. It was observed that the labelling accuracy or the certainty metric value on the target data was about 91.23% when the pseudo-labelling was applied to the target data. However, according to another aspect of the disclosure when the same pseudo-labelled target data was used to retrain the machine learning module, the labelling accuracy or the certainty metric value was about 93.81%. Thus, the method (600) according to an aspect of the disclosure provides increased accuracy of labelling on the target domain with increased certainty metric value.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for domain adaptation, the method comprising:
    obtaining using a same or different medical imaging devices a source data and a target data, wherein the source data and the target data comprises a plurality of frames for training a machine learning module;
    testing the target data to identify if a minimum number of frames from the target data exhibit a frame confidence score based on the source data;
    identifying at least one salient region within the target data and measuring a degree of spatial consistency of the at least one salient region over time;
    identifying at least one class specific attention region within the frames of the target data and measuring a similarity score of the at least one class specific attention region within the frames of the target data as compared to a plurality of class-specific templates;
    carrying out pseudo-labeling of the target data based on a module generated using source data and calculating a certainty metric value indicative of the accuracy of the pseudo-labeling on the target data;
    wherein calculating the certainty metrics value comprises calculating using the frame confidence score, the degree of spatial consistency of the at least one salient region over time, the similarity score of the at least one class specific attention region within the frames of the target data as compared to the plurality of class-specific templates; and
    retraining the machine learning module till the certainty metrics value reaches peak and further retraining the machine learning module does not increase the certainty metrics value.

2. The method of claim 1 wherein the source data and the target data comprise a video data or an image data.

3. The method of claim 2 wherein the video data comprises a plurality of loops.

4. The method of claim 1 wherein the source data is a labeled data and the target data is unlabeled or partially labeled data.

5. The method of claim 1 wherein identifying at least one salient region within the target data and measuring a degree of spatial consistency of the at least one salient region over time comprises measuring domain shift in the target data.

6. The method of claim 1 wherein training the machine learning module comprises using a classification loss function,—and a pseudo-label classification loss function.

7. The method of claim 6 further comprising simultaneously reducing weight of the discrepancy loss function and increasing weight of the pseudo-label loss function ($\alpha$) when certainty metric of the pseudo-labels begins to increase.

8. The method of claim 1 wherein measuring the similarity score of the at least one class specific attention region within the frames of the target data further comprises building a class specific machine learning model for each class of the attention region.

9. The method of claim 1 wherein carrying out pseudo-labeling of the target data based on the source data comprises generating a plurality of annotations on the target unlabeled data and calculating the confidence score of the pseudo-labeled data.

10. The method of claim 1 further comprising calculating the certainty metrics of the target data with pseudo-labels and filtering the target data and when the minimum number of frames from the target data exhibit the frame confidence score above a predetermined threshold, the average confidence score of the target data belonging a class is above the predetermined threshold, consistency of the salient regions for frames across the video data and the confidence score of the class-specific attention regions across the frames is above the predetermined threshold.

11. The method of claim 1 wherein retraining the machine learning module comprises using the source data with annotations and the target filtered data with pseudo-labels to retrain the machine learning module.

12. The method of claim 1 wherein the medical imaging devices comprise one or more of a radiation therapy (RT) devices, an X-ray devices, a computerized tomography (CT) devices, a mammography (MG) devices, a magnetic resonance imaging (MRI) devices, an ultrasound (US) devices, a color flow doppler (CD) devices, a positron emission tomography (PET) devices, a single-photon emissions computed tomography (SPECT) devices and a nuclear medicine (NM) devices.

13. A system for domain adaptation, the system comprising:
a memory to store computer executable components;
a processor to execute the computer executable components stored in the memory, wherein the computer executable components comprise:
a training component adapted to train a machine learning module and configured to receive a source data obtained using a same or different medical imaging devices and wherein the source data comprises a plurality of frames;
an image processing component configured to:
receive a target data from the same or different medical imaging devices;
test the target data to identify if a minimum number of frames from the target data exhibit a frame confidence score based on the source data;
identify at least one salient region within the target data and measure a degree of spatial consistency of the at least one salient region over time;
identify at least one class specific attention region within the target data and measure a confidence score of at least one class specific attention region within the frames of the target data;
a pseudo-labeling component configured to label the target data based on the source data and calculate a confidence score indicative of the accuracy of the pseudo-labeling on the target data;
a model certainty quantification component configured to calculate a certainty metrics value based on the frame confidence score, the degree of spatial consistency of the at least one salient region over time, the confidence score of at least one class specific attention region within the frames of the target data and the confidence score of the pseudo-labeling on the target data; and
a retraining component configured to retrain the machine learning module till the certainty metrics value reaches peak and further retraining the machine learning module does not increase the certainty metrics value.

14. The system of 13 wherein the source data and the target data comprise a video data or an image data.

15. The system of 13 wherein the image processing component is configured identify at least one salient region within the target data and measuring a degree of spatial consistency of the at least one salient region over time and comprises measuring domain shift in the target data.

16. The system of 13 wherein the machine learning module is trained using a classification loss function, and a pseudo-label classification loss function.

17. The system of 13 wherein the pseudo labeling component is configured to carry out pseudo-labeling of the target data based on the source data and comprises generating annotations on the target unlabeled data and calculating the confidence score.

18. The system of 13 wherein the model certainty quantification component is configured to filter the target data along with the annotations and calculate the certainty metrics score of the target filtered data with pseudo-labels when the minimum number of frames from the target data exhibit the frame confidence score above a predetermined threshold, the average confidence score of the target data belonging a class is above the predetermined threshold, consistency of the salient regions for frames across the video data and the confidence score of the class-specific attention regions across the frames is above the predetermined threshold.

19. The system of 13 wherein the retraining module is configured to train the machine learning module using the source data with annotations and the target filtered data with pseudo-labels.

20. The system of 13 wherein the medical imaging devices comprise one or more of a radiation therapy (RT) devices, an X-ray devices, a computerized tomography (CT) devices, a mammography (MG) devices, a magnetic resonance imaging (MRI) devices, an ultrasound (US) devices, a color flow doppler (CD) devices, a positron emission tomography (PET) devices, a single-photon emissions computed tomography (SPECT) devices and a nuclear medicine (NM) devices.

* * * * *